United States Patent
Aoki et al.

(10) Patent No.: US 12,337,879 B2
(45) Date of Patent: Jun. 24, 2025

(54) CONTROL DEVICE FOR VEHICLE

(71) Applicant: TOYOTA JIDOSHA KABUSHIKI KAISHA, Toyota (JP)

(72) Inventors: Masakazu Aoki, Nagoya (JP); Yohsuke Hashimoto, Nagakute (JP); Satoshi Takamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 18/380,233

(22) Filed: Oct. 16, 2023

(65) Prior Publication Data

US 2024/0199086 A1 Jun. 20, 2024

(30) Foreign Application Priority Data

Dec. 14, 2022 (JP) .................. 2022-199655

(51) Int. Cl.
 *B60W 60/00* (2020.01)
(52) U.S. Cl.
 CPC ....... *B60W 60/005* (2020.02); *B60W 2520/04* (2013.01); *B60W 2554/402* (2020.02); *B60W 2554/4041* (2020.02); *B60W 2554/4042* (2020.02); *B60W 2554/802* (2020.02)
(58) Field of Classification Search
 CPC .......... B60W 60/005; B60W 2520/04; B60W 2554/402; B60W 2554/4041; B60W 2554/4042; B60W 2554/802; B60W 30/17; B60W 60/001; B60W 40/09; B60W 2556/10; B60W 2754/30
 See application file for complete search history.

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |

(Continued)

FOREIGN PATENT DOCUMENTS

WO 2018/138767 A1 8/2018

*Primary Examiner* — Ashley L Redhead, Jr.
(74) *Attorney, Agent, or Firm* — Dinsmore & Shohl LLP

(57) ABSTRACT

A control device for a vehicle controls a subject vehicle configured to switch between manual driving and automated driving. The control device includes a processor and a memory device. The processor is configured to execute learning control that learns vehicle-to-vehicle distance when the driver stops the subject vehicle during the manual driving, and to reflect a learning result of the vehicle-to-vehicle distance by the learning control in a control of the vehicle-to-vehicle distance during the automated driving. The memory device is configured to store the vehicle-to-vehicle distance as learning data during the manual driving. In the learning control, the processor is configured to determine, based on vehicle operation information by the driver during a series of periods from a pre-stop period to a post-stop period of the subject vehicle, whether or not the vehicle-to-vehicle distance is caused to be stored in the memory device as the learning data.

5 Claims, 4 Drawing Sheets

(56) References Cited

U.S. PATENT DOCUMENTS

| | | | |
|---|---|---|---|
| 10,486,698 B2 | 11/2019 | Masui et al. | |
| 2019/0295419 A1 | 9/2019 | Tosa et al. | |
| 2020/0050194 A1* | 2/2020 | Choi | G06N 20/00 |
| 2020/0239029 A1* | 7/2020 | Kim | G08G 1/0133 |
| 2021/0300430 A1* | 9/2021 | Kang | B60W 40/09 |

* cited by examiner

FIG. 2

| Learning Conditions C | No. | Condition |
|---|---|---|
| Preconditions C0 | C0-1 | Height H of preceding vehicle < threshold value TH1 |
| | C0-2 | Preceding vehicle not two-wheeled motorcycle |
| | C0-3 | Road not congested |
| | C0-4 | Road surface and visibility good |
| | C0-5 | Not off road |
| | C0-6 | Neither community road nor narrow street |
| | C0-7 | Not merging point |
| | C0-8 | Not tollgate |
| | C0-9 | Road gradient small |
| | C0-10 | Not exclusive road for automobiles |
| Pre-stop learning condition C1 | C1-1 | Vehicle speed V reaches threshold value or more after previous stop |
| Stopping process learning conditions C2 | C2-1 | Subject vehicle stops after stop of preceding vehicle |
| | C2-2 | Both preceding vehicle and subject vehicle stopped in straight-ahead state |
| | C2-3 | Subject vehicle not change lanes |
| | C2-4 | Subject vehicle stops toward same preceding vehicle |
| | C2-5 | No intention to turn right or left, or to pass preceding vehicle |
| | C2-6 | Vehicle-to-vehicle distance D equal to or less than threshold value |
| | C2-7 | Stop of subject vehicle not accompanied by sudden braking |
| | C2-8 | Braking performed by driver's own operation |
| Post-stop learning conditions C3 | C3-1 | Both preceding vehicle and subject vehicle continuously stopped for designated time |
| | C3-2 | No intention to turn right or left, or to pass preceding vehicle |
| | C3-3 | Not a stop for parking |
| | C3-4 | No other vehicle cutting in or crossing |
| | C3-5 | Subject Vehicle not change vehicle-to-vehicle distance D after stopping |

CONTROL DEVICE FOR VEHICLE

CROSS-REFERENCES TO RELATED APPLICATION

The present disclosure claims priority under 35 U.S.C. § 119 to Japanese Patent Application No. 2022-199655, filed on Dec. 14, 2022, which is incorporated herein by reference in its entirety.

TECHNICAL FIELD

The present disclosure relates to a control device for a vehicle configured to switch between manual driving and automated driving.

BACKGROUND

WO 2018/138767 A1 discloses a traveling characteristic learning method. In the traveling characteristic learning method, in a vehicle that can switch between manual driving by a driver and automated driving, a vehicle-to-vehicle distance during a deceleration operation in the manual driving by the driver is preferentially learned. Further, in the traveling characteristic learning method, learning conditions for determining whether or not the current traveling state is appropriate for acquiring the data used for learning the traveling characteristics include that the vehicle-to-vehicle distance between the vehicle and a preceding vehicle while the vehicle is stopped is within a designated value.

SUMMARY

A learning control may be executed to learn the driver's preference for the vehicle-to-vehicle distance of a subject vehicle with respect to a preceding vehicle when the driver stops the subject vehicle during manual driving, and the result of the learning may be reflected in a control of the vehicle-to-vehicle distance during automated driving. Regarding the vehicle-to-vehicle distance between the vehicle and the preceding vehicle while the vehicle is stopped. WO 2018/138767 A1 discloses only that the vehicle-to-vehicle distance is within a designated value as the learning conditions for the traveling characteristics. However, the learning conditions disclosed in this way alone may not be sufficient for appropriately learning the driver's preference for the vehicle-to-vehicle distance when the vehicle is stopped, which is the target of the learning control described above.

The present disclosure has been made in view of the problem described above, and an object thereof is to provide a control device for a vehicle that can appropriately learn the preference of a driver regarding the vehicle-to-vehicle distance of a subject vehicle with respect to a preceding vehicle when the driver stops the subject vehicle during manual driving.

A control device for a vehicle according to the present disclosure is configured to control a subject vehicle configured to switch between manual driving by a driver and automated driving. The control device includes a processor and a memory device. The processor is configured to execute learning control that learns vehicle-to-vehicle distance of the subject vehicle with respect to a preceding vehicle when the driver stops the subject vehicle during the manual driving, and to reflect a learning result of the vehicle-to-vehicle distance by the learning control in a control of the vehicle-to-vehicle distance during the automated driving. The memory device is configured to store the vehicle-to-vehicle distance as learning data during the manual driving. In the learning control, the processor is configured to determine, based on vehicle operation information by the driver during a series of periods from a pre-stop period to a post-stop period of the subject vehicle, whether or not the vehicle-to-vehicle distance is caused to be stored in the memory device as the learning data. In addition, machine learning may be used to acquire the learning result of the vehicle-to-vehicle distance by the learning control.

According to the control device of the present disclosure, the preference of the driver regarding the vehicle-to-vehicle distance of the subject vehicle with respect to the preceding vehicle when the driver stops the subject vehicle during the manual driving can be appropriately learned.

BRIEF DESCRIPTION OF DRAWINGS

FIG. 2 is a table showing an example of a list of learning conditions C according to the embodiment;

DETAILED DESCRIPTION

Embodiments of the present disclosure will be described with reference to the accompanying drawings.

1. Configuration of Vehicle

Figure 1:
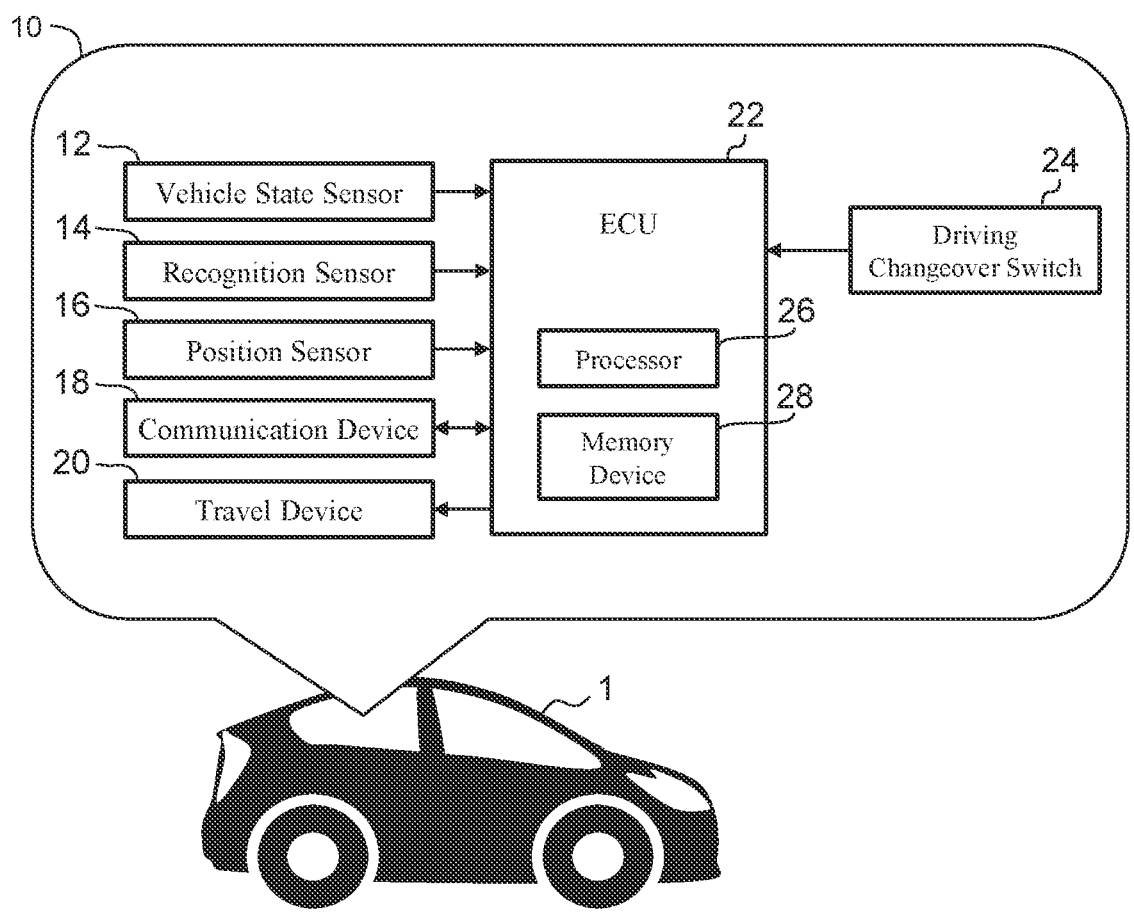
FIG. 1 is a diagram schematically illustrating an example of a configuration of a vehicle (subject vehicle) according to an embodiment.

FIG. 1 is a diagram schematically illustrating an example of a configuration of a vehicle 1 according to an embodiment. The vehicle 1 includes a vehicle control system 10. The vehicle control system 10 is mounted on the vehicle 1 and is configured to control traveling of the vehicle 1. The vehicle control system 10 includes a vehicle state sensor 12, a recognition sensor 14, a position sensor 16, a communication device 18, a travel device 20, an electronic control unit (ECU) 22, and a driving changeover switch 24.

The vehicle state sensor 12 detects a state of the vehicle 1. The vehicle state sensor 12 includes, for example, a vehicle speed sensor, an acceleration sensor, an accelerator pedal sensor, a brake pedal sensor, a steering angle sensor, and a blinker sensor. The blinker sensor detects an operating state of a blinker. The recognition sensor 14 recognizes (detects) a situation around the vehicle 1. The recognition sensor 14 includes, for example, a camera. The position sensor 16 detects a position and a direction of the vehicle 1. The position sensor 16 includes, for example, a global navigation satellite system (GNSS) receiver.

The communication device 18 communicates with the outside of the vehicle 1. The communication device 18 communicates with, for example, an external system and acquires various pieces of information. The information includes, for example, map information and traffic information. The map information includes road information, such as road gradient. The traffic information includes, for example, traffic jam information, information on a road surface state, and information on visibility, such as heavy rain or occurrence of fog. In addition, the communication device 18 may include, for example, a vehicle-to-vehicle communication device that enables communication between the vehicle 1 and surrounding vehicles (i.e., vehicle-to-vehicle communication (V2V)).

The travel device 20 is a device that operates the vehicle 1. For example, the travel device 20 includes a drive device, a brake device, and a steering device. The drive device includes, for example, at least one of an electric motor and an internal combustion engine for driving (accelerating) the vehicle 1. The brake device includes a brake actuator for braking (decelerating) the vehicle 1. The steering device includes, for example, a steering motor for steering the vehicle 1.

The ECU 22 is a computer configured to control the vehicle 1 and corresponds to an example of the "control device for a vehicle" according to the present disclosure. The ECU 22 includes a processor 26 and a memory device 28. The processor 26 executes various processes. The various processes include processes related to vehicle travel control described below. The memory device 28 stores various types of information necessary for processing by the processor 26. When the processor 26 executes computer programs, various processes by the ECU 22 are realized. The computer programs are stored in the memory device 28. Alternatively, the computer programs may be recorded on a computer-readable recording medium. In addition, the ECU 22 may be configured by combining a plurality of ECUs.

The vehicle control system 10 is configured to perform automated driving control for controlling "automated driving" of the vehicle 1. This automated driving control includes vehicle stop control for controlling a vehicle-to-vehicle distance D such that the vehicle (subject vehicle) 1 stops behind a preceding vehicle at a target vehicle-to-vehicle distance Dt. More specifically, the automated driving referred to here corresponds to, for example, automated driving at level 3 or higher in the definition of the Society of Automotive Engineers (SAE) in the United States, but is not necessarily limited to the automated driving at level 3 or higher. That is, the automated driving control may be any control as long as it has the vehicle stop control described above, and may be, for example, an adaptive cruise control (ACC) that can perform braking control up to 0 km/h. A known technique is applied to the automated driving control. Therefore, a detailed description of the automated driving control is omitted.

The driving changeover switch 24 is operated by the driver, and is used to switch the driving of the vehicle 1 between manual driving by the driver and the automated driving. That is, the vehicle 1 is configured to switch between the manual driving and the automated driving. The manual driving is performed by the driver's own intention to operate an accelerator pedal, a brake pedal, and a steering wheel of the vehicle 1.

2. Vehicle Travel Control

In the present embodiment, when the automated driving is selected by the driver who operates the driving changeover switch 24, the ECU 22 performs the above-described automated driving control including the vehicle-stop control. On the other hand, when the manual driving is selected by the driver, the ECU 22 performs the following "vehicle-to-vehicle learning control".

2-1. Vehicle-to-Vehicle Learning Control During Stop

The vehicle-to-vehicle learning control (or simply learning control) according to the present embodiment learns the vehicle-to-vehicle distance D (see FIGS. 3A to 3C, for example) of the subject vehicle 1 with respect to a preceding vehicle when the driver stops the subject vehicle 1 during the manual driving. Learning results (for example, a learning value DL described below) of the vehicle-to-vehicle distance D by this learning control is reflected in the control of the vehicle-to-vehicle distance D during the automated driving.

One or more learning conditions C are conditions for executing the learning by the learning control. In other words, the one or more learning conditions C are conditions for storing the vehicle-to-vehicle distance D which is learning data in the learning control. The one or more learning conditions C are set as follows in order to accurately grasp the driver's preference regarding the vehicle-to-vehicle distance D at the time when the subject vehicle 1 is stopped.

FIG. 2 is a table showing an example of a list of learning conditions C according to the embodiment. In the example illustrated in FIG. 2, the learning conditions C include three types of learning conditions C1 to C3 together with preconditions C0. The learning condition C1 is a learning condition related to a pre-stop period P1 (i.e., pre-stop learning conditions). The learning conditions C2 are learning conditions related to a stopping process P2 (i.e., stopping process learning condition). The learning conditions C3 are learning conditions related to a post-stop period P3 (i.e., post-stop learning conditions). The learning conditions C are satisfied when all of these conditions C0 to C3 are satisfied.

The pre-stop period P1 corresponds to a period before the start of deceleration based on a driver operation for stopping the subject vehicle 1. The pre-stop period P1 may be, for example, a period from an end time point of the post-stop period P3 related to the previous stop of the subject vehicle 1 to a start time point t0 of deceleration (including braking) for the current stop. Alternatively, when the start time point to the deceleration can be predicted, the pre-stop period P1 may be a period whose end point is the start time point t0 of the deceleration. The stopping process P2 is a period from the start time point t0 of the deceleration to a stop completion time point t1 of the subject vehicle 1. The post-stop period P3 is a designated period of time from the stop completion time point t1.

The learning conditions C are directed to a series of periods P including the pre-stop period P1, the stopping process P2, and the post-stop period P3 by including the learning conditions C1 to C3. By using these learning conditions C1 to C3, in the learning control according to the present embodiment, the ECU 22 (processor 26) determines whether or not to store, as the learning data, the vehicle-to-vehicle distance D in the memory device 28 based on a driver's vehicle operation information during the series of periods P.

First, the pre-stop learning condition C1 includes, for example, that the vehicle speed V of the subject vehicle 1 has reached a threshold value or more after the previous stop (condition C1-1). In other words, the condition C1-1 is that, in the pre-stop period P1, the subject vehicle 1 is not in the stop-and-go driving, that is, not traveling slowly. When the subject vehicle 1 stops from the stop-and-go driving due to factors, such as the arrangement of traffic lights in front of the subject vehicle 1 or traffic congestion, the vehicle-to-vehicle distance D is likely to correspond to the state of the surroundings. As a result, the acquired vehicle-to-vehicle distance D does not accurately grasp the driver's preference. Therefore, according to the condition C1-1, it is possible to exclude, from the learning target, a scene in which the subject vehicle 1 stops from the stop-and-go driving, that is, a scene in which it is difficult to accurately grasp the preference of the driver. It should be noted that there may be a plurality of pre-stop learning conditions C1.

Next, the stopping process learning conditions C2 include, for example, conditions C2-1 to C2-5. The condition C2-1 is that the subject vehicle 1 has stopped after the stop of the preceding vehicle. The condition C2-2 is that both the preceding vehicle and the subject vehicle 1 have stopped in a straight-ahead state. The condition C2-3 is that the subject vehicle 1 does not change lanes during the stopping process P2. The condition C2-4 is that the subject vehicle 1 has stopped toward the same preceding vehicle (in other words, that there is no interruption or crossing of another vehicle between the preceding vehicle and the subject vehicle 1). The condition C2-5 is that the driver of the subject vehicle 1 has no intention to turn right or left, or to pass the preceding vehicle. By using these conditions C2-1 to C2-5, the vehicle-to-vehicle distance D that is easy for the driver to control can be grasped as the learning data.

Moreover, the learning conditions C2 includes, for example, that the vehicle-to-vehicle distance D obtained when the vehicle stops this time is equal to or less than a threshold value (condition C2-6). The reason for this is that, if the vehicle-to-vehicle distance D is long, there is a possibility that the vehicle-to-vehicle distance D may have been secured to be long in order to give way to another vehicle. Further, the learning conditions C2 include, for example, that the stop of the subject vehicle 1 is not accompanied by sudden braking by the driver (condition C2-7). This is because it is unlikely that the subject vehicle 1 has stopped at the vehicle-to-vehicle distance D according to the preference of the driver. Furthermore, the learning conditions C2 include, for example, that braking is performed by the driver's own operation (condition C2-8). The reason for this is to capture the preference of the driver by excluding the time of braking with an emergency brake that is automatically activated by control by the vehicle control system 10 during the manual driving.

Next, the post-stop learning conditions C3 include, for example, a condition that both the preceding vehicle and the subject vehicle 1 are continuously stopped for a designated time (condition C3-1). The reason for this is to capture a stable stop scene. This designated period may be the same as or shorter than the designated period of time for specifying the post-stop period P3. Further, the learning conditions C3 include, for example, that the driver of the subject vehicle 1 has no intention to turn right or left, or to pass the preceding vehicle (condition C3-2). This is because there is a possibility that the vehicle-to-vehicle distance D different from usual may be secured for turning right or left or passing.

Moreover, the learning conditions C3 include, for example, that the stop of the subject vehicle 1 is not a stop for parking (condition C3-3). This is because there is a possibility that the vehicle-to-vehicle distance D may be different from the preference of the driver in order to keep the subject vehicle 1 within the parking frame. Further, the learning conditions C3 include, for example, that no other vehicle cuts in or crosses between the preceding vehicle and the subject vehicle 1 (condition C3-4). This is because there is a possibility that the vehicle-to-vehicle distance D may be secured to be long in order to give way to another vehicle. Furthermore, the learning conditions C3 include, for example, that the subject vehicle 1 has not changed the vehicle-to-vehicle distance D after stopping (condition C3-5). This is because it is difficult to determine which of the vehicle-to-vehicle distances D before and after the change indicates the preference of the driver. In addition, the post-stop learning conditions C3 may be, for example, any one of the conditions C3-1 to C3-5, or some but not all of the conditions C3-1 to C3-5.

Next, the preconditions C0 include a condition C0-1 and a condition C0-2, which are conditions based on the vehicle type of the preceding vehicle. The vehicle-to-vehicle distance D adjusted by the driver of the subject vehicle 1 during the manual driving is affected by the height H of the preceding vehicle. That is, when the height H is large, the front view of the driver is likely to be obstructed during the stop of the subject vehicle 1. For example, traffic lights or signs ahead becomes difficult to see. Therefore, it is considered that, when the subject vehicle 1 stops behind a preceding vehicle having a larger height H than that of the subject vehicle 1, the driver tends to secure a longer vehicle-to-vehicle distance D as compared with when the subject vehicle 1 stops behind a preceding vehicle having a height H equal to or less than that of the subject vehicle 1. As described above, the vehicle-to-vehicle distance D may vary depending on the height H of the preceding vehicle.

In view of the above points, the condition C0-1 is that the height H of the preceding vehicle is less than a designated threshold value TH1. That is, in the learning control, when the height H of the preceding vehicle is less than the threshold value TH1, the ECU 22 stores the vehicle-to-vehicle distance D for the preceding vehicle in the memory device 28 as the learning data. On the other hand, when the height H is equal to or greater than the threshold value TH1, the ECU 22 does not store the vehicle-to-vehicle distance D in the memory device 28 as the learning data. As described above, by limiting the learning target to the vehicle type in which the driver of the subject vehicle 1 can easily secure the field of view, it is possible to avoid the variation of the learning data of the vehicle-to-vehicle distance D caused by the difference of the vehicle type.

Figure 3A:
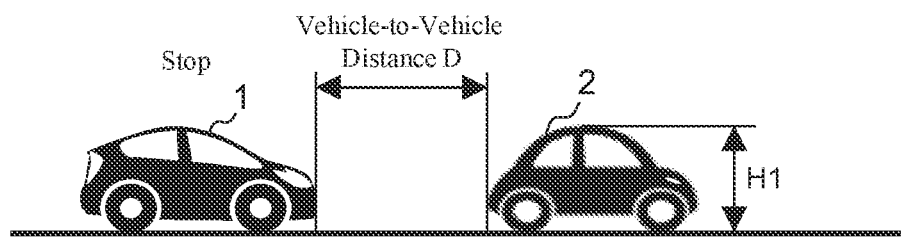
FIG. 3A is a diagram illustrating a specific example of the type of a preceding vehicle when the subject vehicle is stopped.
Figure 3B:
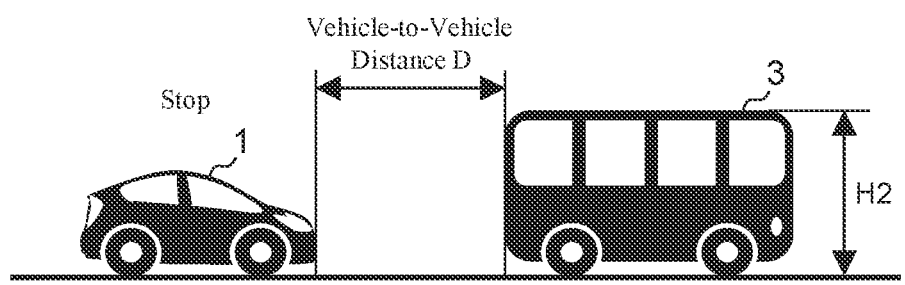
FIG. 3B is a diagram illustrating a specific example of the type of a preceding vehicle when the subject vehicle is stopped.
Figure 3C:
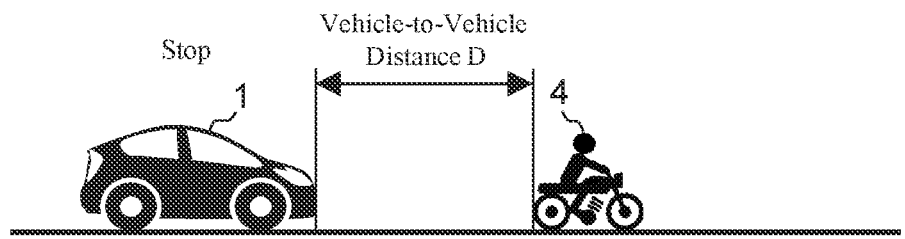
FIG. 3C is a diagram illustrating a specific example of the type of a preceding vehicle when the subject vehicle is stopped.

FIGS. 3A to 3C are diagrams illustrating specific examples of the vehicle type of the preceding vehicle when the subject vehicle 1 is stopped. A preceding vehicle 2 in the example shown in FIG. 3A has a height H1 equivalent to that of the subject vehicle 1. On the other hand, a preceding vehicle 3 in the example shown in FIG. 3B has a height H2 greater than that of the subject vehicle 1.

Specifically, the preceding vehicle 2 is a car, and more specifically, for example, a four-wheeled car. The preceding vehicle 2 corresponds to, for example, a standard-sized car (a standard-sized passenger car, a compact passenger car, or a Japanese microcar) in the Japanese Road Traffic Law. In addition, the preceding vehicle 2 may be a private car or a commercial car. On the other hand, the preceding vehicle 3 is a larger vehicle (for example, a truck or a bus) than the preceding vehicle 2. More specifically, the preceding vehicle 3 corresponds to, for example, a semi-medium-sized vehicle, a medium-sized vehicle, or a large-sized vehicle in the Japanese Road Traffic Law.

The threshold value TH1 is determined in advance as a value that can distinguish the preceding vehicle 2 from the preceding vehicle 3. That is, the threshold value TH1 is located between the height H1 of the preceding vehicle 2 and the height H2 of the preceding vehicle 3. In other words, the threshold value TH1 corresponds to a value that can distinguish the standard-sized car from a vehicle having a height H greater than that of the standard-sized car.

In the example described with reference to the preceding vehicles 2 and 3, it is assumed that, like the preceding vehicle 2, the subject vehicle 1 is a standard-sized car. However, the type of the subject vehicle 1 is not necessarily limited to the standard-sized car. That is, the condition for excluding a preceding vehicle from the learning target in consideration of the vehicle type may be, for example, that the height H of the preceding vehicle is greater than the height of the subject vehicle 1 and the relative height ΔH of the preceding vehicle with respect to the subject vehicle 1 is equal to or greater than a designated threshold value.

Moreover, a preceding vehicle 4 in the example shown in FIG. 3C is a two-wheeled motorcycle. When the subject vehicle 1 is a four-wheeled car and the preceding vehicle is a two-wheeled motorcycle, it is considered that the driver tends to have difficulty in grasping an appropriate vehicle-to-vehicle distance D due to reasons, such as the size and behavior of the preceding vehicle. Therefore, when following a two-wheeled motorcycle, it is considered that the driver tends to secure a long vehicle-to-vehicle distance D or that the vehicle-to-vehicle distance D tends to become unstable, as compared with when following a four-wheeled car, such as a standard-sized car.

In view of the above points, the condition C0-2 is that the preceding vehicle is not a two-wheeled motorcycle. That is, the condition for excluding a preceding vehicle from the learning target in consideration of the vehicle type includes that the preceding vehicle is a two-wheeled motorcycle. Therefore, in the learning control, when the preceding vehicle is a two-wheeled motorcycle, the ECU 22 does not store the vehicle-to-vehicle distance D in the memory device 28 as the learning data. As a result, it is possible to prevent the learning data of the vehicle-to-vehicle distance D from varying due to the difference in the sense of approach to the preceding vehicle caused by the difference in the vehicle type.

As described above, according to the conditions C0-1 and C0-2, whether or not the learning data (i.e., the vehicle-to-vehicle distance D) is stored in the memory device 28 for a preceding vehicle is determined (changed) in accordance with the vehicle type of the preceding vehicle. In addition, instead of the conditions C0-1 and C0-2, for example, a condition that the vehicle type of the subject vehicle 1 is the same as that of the preceding vehicle may be included as one of the preconditions C0.

Moreover, the preconditions C0 include, for example, conditions C0-3 to C0-8. The condition C0-3 is that the road on which the subject vehicle 1 travels is not congested. The condition C0-4 is that the road surface and the visibility are good. The condition C0-5 is that the subject vehicle 1 is not off the road (for example, in a parking lot or on a site). The condition C0-6 is that the road of the subject vehicle 1 is neither a community road nor a narrow street. The condition C0-7 includes a condition that the traveling point of the subject vehicle 1 is not a merging point of a plurality of roads. The condition C0-8 is that the traveling point of the subject vehicle 1 is not a tollgate. According to each of the conditions C0-3 to C0-8, it is possible to avoid a scene in which the vehicle-to-vehicle distance D by the driver is likely to correspond to the state of the surroundings, and to accurately grasp the preference of the driver.

Moreover, the preconditions C0 include, for example, that the absolute value of the road gradient is small (condition C0-9). This is because when the absolute value of the road gradient is large, such as a steep downhill, the driver may pay attention to the slip-down of the subject vehicle 1 at the time of stopping, and the preference of the driver may not appear in the vehicle-to-vehicle distance D. Furthermore, the preconditions C0 include, for example, that the subject vehicle 1 is not traveling on an exclusive road for automobiles, such as an expressway (condition C0-10). This is because the stop of the subject vehicle 1 on the exclusive road for automobiles is caused by a factor such as a traffic jam, and the vehicle-to-vehicle distance D is likely to correspond to the state of the surroundings.

2-2. Processing Flow

Figure 4:
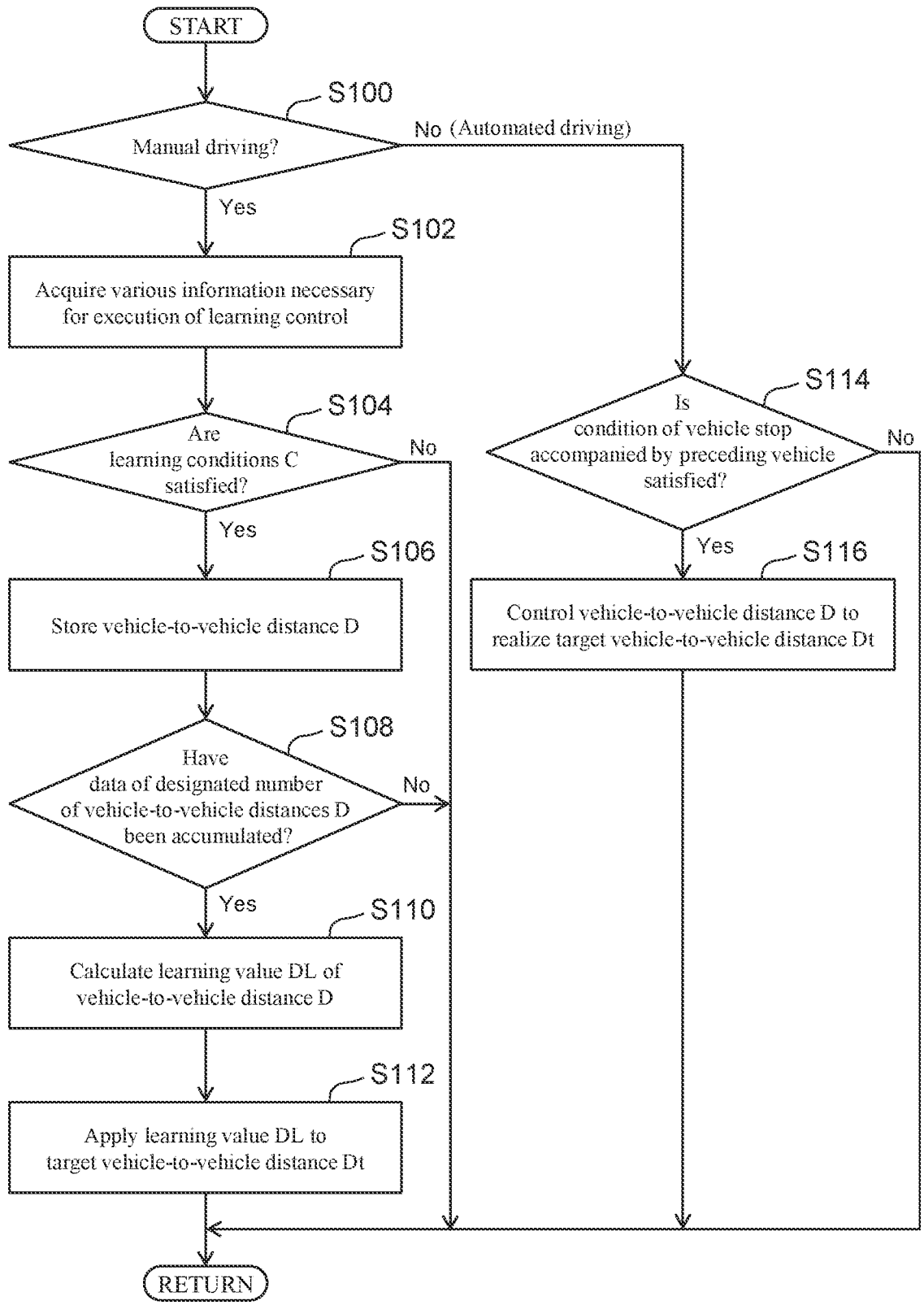
FIG. 4 is a flowchart illustrating an example of processing related to vehicle travel control according to the embodiment.

FIG. 4 is a flowchart illustrating an example of processing related to the vehicle travel control according to the embodiment. The processing of this flowchart is repeatedly executed during activation of the vehicle control system 10.

In step S100, the ECU 22 (processor 26) determines whether the vehicle 1 is in the manual driving or in the automated driving. This determination can be made based on, for example, the operating state of the driving changeover switch 24.

When the vehicle 1 is in the manual driving (Step S100; Yes), the processing proceeds to step S102. In step S102, the ECU 22 acquires various kinds of information necessary for execution of the learning control. The various kinds of information include the vehicle-to-vehicle distance D at the time of stop. More specifically, if the subject vehicle 1 is in a state of being stopped behind the preceding vehicle (that is, in a state in which the vehicle speed V is 0 km/h) when the processing proceeds to step S102, the vehicle-to-vehicle distance D is acquired by using, for example, the recognition sensor 14. Also, the various kinds of information described above include information necessary for determining whether or not the learning conditions C (for example, see FIG. 2) are satisfied. The information includes the height H of the preceding vehicle. The height H is acquired using, for example, the recognition sensor 14 or the vehicle-to-vehicle communication. In addition, the other information for determining the learning conditions C is acquired using, for example, information from the vehicle state sensor 12 and the recognition sensor 14, the road information (map information), and the traffic information.

In step S104 subsequent to step S102, the ECU 22 determines whether or not the learning conditions C are satisfied. More specifically, it is determined whether all of the conditions C0 to C3 described above are satisfied. As a result, when the learning conditions C are satisfied, that is, when it is determined that the subject vehicle 1 is stopped in a scene in which the preference of the driver appears in the vehicle-to-vehicle distance D, the processing proceeds to step S106. In addition, the learning conditions C are satisfied when all of the conditions C0 to C3 are satisfied at the timing when the post-stop period P3 described above has elapsed.

On the other hand, when at least one of the conditions C0 to C3 described above is not satisfied, the learning conditions C are not satisfied. When the learning conditions C are not satisfied, the processing proceeds to RETURN.

In step S106, the ECU 22 stores the vehicle-to-vehicle distance D acquired in step S102. That is, when the learning conditions C are satisfied, the vehicle-to-vehicle distance D is stored in the memory device 28 as the learning data.

In step S108 subsequent to step S106, the ECU 22 determines whether data of a designated number of vehicle-to-vehicle distances D have been accumulated. The designated number is, for example, 30. When the data of the designated number of vehicle-to-vehicle distances D has not yet been accumulated (step S108; No), the processing proceeds to RETURN. On the other hand, when the data of the designated number is accumulated (step S108; Yes), the processing proceeds to step S110.

In step S110, the ECU 22 calculates a learning value DL of the vehicle-to-vehicle distance D. For example, an average value of the accumulated data of the vehicle-to-vehicle distances D is calculated as the learning value DL. Thereafter, the processing proceeds to step S112.

In step S112, the ECU 22 applies the learning value DL calculated in step S110 to the target vehicle-to-vehicle distance Dt. That is, the target vehicle-to-vehicle distance Dt is updated with the latest learning value DL. The target vehicle-to-vehicle distance Dt is used in the vehicle stop control performed during the automated driving.

On the other hand, when the vehicle 1 is in the automated driving (step S100; No), the processing proceeds to step S114. In step S114, the ECU 22 determines whether or not a designated vehicle stop condition accompanied by a preceding vehicle is satisfied by using, for example, information obtained from the recognition sensor 14. As a result, when this vehicle stop condition is satisfied, the processing proceeds to step S116. On the other hand, when the vehicle stop condition is not satisfied, the processing proceeds to RETURN.

In step S116, the ECU 22 controls the travel device 20 to control the (actual) vehicle-to-vehicle distance D so as to realize the target vehicle-to-vehicle distance Dt. As described above, by the processing from step S112 to step S116, the learning result (i.e., the learning value DL) of the vehicle-to-vehicle distance D by the learning control is reflected in the control of the vehicle-to-vehicle distance D during the automated driving.

In addition, the learning value DL may be acquired by using, for example, a machine learning model instead of the processing illustrated in FIG. 4. That is, the machine learning model is constructed by using various designated parameters as inputs and using the learning value DL as an output. For example, the various parameters are a plurality of parameters related to the preconditions C0 described above. More specifically, it is possible to use a parameter indicating that each of the preconditions C0 is satisfied (for example, the road on which the subject vehicle 1 travels is not congested) and a parameter indicating that each of the preconditions C0 is not satisfied (for example, the road is congested). Learning of the machine learning model is performed using, for example, learning data acquired during the traveling of the vehicle 1 (that is, the various parameters described above which are explanatory variables (inputs) and the vehicle-to-vehicle distance D which is an object variable).

3. Effect

The driver's operation for stopping the subject vehicle 1 during the manual driving is affected by various environments and situations around the subject vehicle 1 in the series of periods P including not only the stopping process P2 but also the pre-stop period P1 and the post-stop period P3 (for example, refer to the description related to FIG. 2). Also, the influence appears in the vehicle-to-vehicle distance D at the time of stop based on the driver's operation. According to the present embodiment described above, whether or not to store, as the learning data, the vehicle-to-vehicle distance D in the memory device 28 is determined based on the vehicle operation information by the driver during the series of periods P. As described above, according to the present embodiment, the operation of the subject vehicle 1 by the driver and the vehicle behavior accompanying the operation during the series of time periods P including before and after the stop are considered as the learning conditions C. As a result, it is possible to reduce the variation in the learning results due to the influence of various environments and situations around the subject vehicle 1 in the series of periods P. Therefore, the driver's preference for the vehicle-to-vehicle distance D can be learned at an appropriate timing. Further, during the automated driving, the target vehicle-to-vehicle distance Dt appropriately learned based on the preference of the driver can be used. Therefore, it is possible to realize the automated driving in which the stress of the driver is reduced.

4. Other Examples of Executing Learning Control

Each of the preconditions C0-1 to C0-6, C0-9, and C0-10 described above may be used as follows, instead of limiting the traveling scene to be learned as in the processing of step S104. That is, for example, regarding the precondition C0-3, the learning control according to the present embodiment may be executed separately for the time when the road on which the subject vehicle 1 travels is not congested and the time when the road is congested. The same applies to the other preconditions C0-1, C0-2, C0-4 to C0-6, C0-9, and C0-10.

The invention claimed is:

1. A control device for controlling a subject vehicle configured to switch between manual driving by a driver and automated driving, the control device comprising:
    a processor configured to execute learning control that learns vehicle-to-vehicle distance of the subject vehicle with respect to a preceding vehicle when the driver stops the subject vehicle during the manual driving, and to reflect a learning result of the vehicle-to-vehicle distance by the learning control in a control of the vehicle-to-vehicle distance during the automated driving; and
    a memory device configured to store the vehicle-to-vehicle distance as learning data during the manual driving, wherein
    in the learning control, the processor is configured to determine, based on vehicle operation information by the driver during a series of periods from a pre-stop period to a post-stop period of the subject vehicle, whether or not the vehicle-to-vehicle distance is caused to be stored in the memory device as the learning data.

2. The control device according to claim 1, wherein
    one or more learning conditions of storing the learning data in the learning control include one or more post-stop learning conditions related to the post-stop period,
    the one or more post-stop learning conditions include at least one of:
    a condition that both the preceding vehicle and the subject vehicle are continuously stopped for a designated time;
    a condition that the driver has no intention to turn right or left, or to pass the preceding vehicle;
    a condition that a stop of the subject vehicle is not a stop for parking;
    a condition that no other vehicle cuts in or crosses between the preceding vehicle and the subject vehicle; and
    a condition that the subject vehicle has not changed the vehicle-to-vehicle distance after stopping.

3. The control device according to claim 1, wherein
one or more learning conditions of storing the learning data in the learning control include one or more pre-stop learning conditions related to the pre-stop period, and
the one or more pre-stop learning conditions include a condition that vehicle speed of the subject vehicle has reached a threshold value or more after the subject vehicle stops last time.

4. The control device according to claim 1, wherein
in the learning control, the processor is configured:
when a height of the preceding vehicle is less than a threshold value, to store the vehicle-to-vehicle distance in the memory device as the learning data; and
when the height is equal to or greater than the threshold value, not to store the vehicle-to-vehicle distance in the memory device as the learning data.

5. The control device according to claim 1, wherein
the subject vehicle is a four-wheeled car, and
in the learning control, when the preceding vehicle is a two-wheeled motorcycle, the processor is configured not to store the vehicle-to-vehicle distance in the memory device as the learning data.

* * * * *